(12) United States Patent
Leister et al.

(10) Patent No.: US 8,181,943 B2
(45) Date of Patent: May 22, 2012

(54) HUMIDIFIER

(75) Inventors: Klaus Leister, Weinheim (DE); Harald Ehrentraut, Darmstadt (DE)

(73) Assignee: Carl Freudenberg KG, Weinheim (DE)

( * ) Notice: Subject to any disclaimer, the term of this patent is extended or adjusted under 35 U.S.C. 154(b) by 884 days.

(21) Appl. No.: 11/884,167

(22) PCT Filed: Feb. 24, 2006

(86) PCT No.: PCT/EP2006/001712
§ 371 (c)(1),
(2), (4) Date: May 27, 2008

(87) PCT Pub. No.: WO2006/092242
PCT Pub. Date: Sep. 8, 2006

(65) Prior Publication Data
US 2009/0121366 A1   May 14, 2009

Related U.S. Application Data

(60) Provisional application No. 60/726,567, filed on Oct. 14, 2005.

(30) Foreign Application Priority Data

Mar. 1, 2005 (DE) .......... 10 2005 009 850
Jun. 20, 2005 (DE) .......... 10 2005 028 717

(51) Int. Cl.
*F24F 6/04* (2006.01)

(52) U.S. Cl. ........ 261/104; 261/130; 261/136; 261/142; 261/DIG. 4; 261/DIG. 15; 96/294; 165/222; 126/350.2

(58) Field of Classification Search ............ 261/130, 261/136, 142, DIG. 4, DIG. 15; 96/294; 165/222; D23/356; 126/350.2
See application file for complete search history.

(56) References Cited

U.S. PATENT DOCUMENTS

| 6,554,261 B2 | 4/2003 | Katagiri et al. |
| 6,805,988 B2 * | 10/2004 | Shimanuki et al. ........... 429/414 |
| 7,087,328 B2 | 8/2006 | Shimanuki et al. |
| 2002/0039674 A1 | 4/2002 | Suzuki et al. |
| 2002/0041989 A1 * | 4/2002 | Shimanuki et al. ............. 429/34 |

FOREIGN PATENT DOCUMENTS

| DE | 10102358 | 8/2001 |
| DE | 102 01 302 A1 | 8/2002 |
| DE | 10244707 | 4/2004 |
| EP | 1338852 | 8/2003 |
| JP | 05033975 | 2/1993 |
| JP | 07245116 | 9/1995 |

* cited by examiner

*Primary Examiner* — Robert J Hill, Jr.
*Assistant Examiner* — Christopher P Jones
(74) *Attorney, Agent, or Firm* — Pearl Cohen Zedek Latzer, LLP

(57) ABSTRACT

A humidifier (1), including at least one housing (2), in which multiple fibers (3) constructed as water-permeable hollow fiber membranes are arranged, wherein a first air stream (4) is passed inside the fibers (3) and a second air stream (5) is passed outside the fibers (3), and wherein the housing (2) is of flattened design.

15 Claims, 8 Drawing Sheets

HUMIDIFIER

This application is a national phase of International Application No. PCT/EP2006/001712, filed Feb. 24, 2006, which claims priority to DE 10 2005 009 850.9, filed Mar. 1, 2005 and DE 10 2005 028 717.4, filed Jun. 20, 2005. Applicants also claim priority to U.S. Patent Application No. 60/726,567 filed Oct. 14, 2005.

TECHNICAL AREA

The invention relates to a humidifier, including at least a housing in which a plurality of fibres are arranged as steam-permeable hollow fibre membranes, wherein a first air stream may be passed inside the fibres and a second air stream may be passed outside of the fibres.

RELATED ART

Humidifiers of such kind are known from DE 101 02 358. The previously known humidifier is used primarily in fuel cells. A supply of humidified inlet air is particularly necessary with polymer electrolyte membrane (PEM) fuel cells, since the power generating efficiency in the electrolyte membrane decreases when the electrolyte membrane dries up. The previously known humidifier has several housings, each of which contains a multiplicity of water-permeable hollow fibre membranes. The housings are of tubular design and are combined into a tube register. Tubular housings extend by the same distance both vertically and horizontally, so that the space requirement is the same in both directions.

SUMMARY OF THE INVENTION

The object of the invention is to provide a humidifier with low space requirement.

This object is solved with the features of claim 1. Advantageous embodiments are described in the subordinate claims.

To solve the task of a humidifier, the housing is provided in a flattened construction. When viewed transversely to the direction of the airflow, the housing may be for example ellipsoidal or rectangular in shape. The flat design results in an overall low-profile construction of the humidifier, which allows limited installation spaces to be used, particularly in the vertical dimension. The fibres may be combined in fibre modules, which may have a rectangular or square shape. An arrangement of rectangular fibre modules in an ellipsoidal housing results in a clear, fibre-free cross-section at the top and bottom. The fibre-free cross-section assures even distribution of the air flowing in and out. Moreover, an ellipsoidal housing is pressure stable, which is particularly advantageous when dealing with high internal pressures.

In one embodiment, the first air stream may be steam-containing humidifying air for a downstream unit and the second air stream may be a supply air stream. According to this embodiment, the steam-containing humidifying air flows outside the fibres and the supply air stream flows within the fibres. In this context, it is advantageous that a large flow cross-section is available for the humidifying air. The steam-containing humidifying air is often composed of the process air of a fuel cell, which has a high steam content. Passing the humidifying air outside the fibres prevents the fibres from becoming clogged. For humidification, the steam is transferred from the humidifying air into the hydrophilic fibres, condensed in the capillaries of the fibres, and is released to the supply air, which flows along the inner wall of the fibres. In other embodiments, the first air stream may be formed by the supply air and the second air stream may be formed by the steam-containing humidifying air.

The first air stream and the second air stream may be able to flow in opposite directions. In the case of mass transfer in the counterflow, the supply air to be humidified is constantly enriched with liquid and the humidifying air constantly releases steam. In this process, considered over the entire length of the fibres, the release of steam and the steam uptake are almost constant. Uniform mass transfer takes place over the length of the fibre.

In other embodiments, the air streams may also flow in parallel. This is particularly advantageous when only one limited length is available, since the gradient of the mass transfer is greatest at the beginning of the fibre and falls quickly, so that only small amounts of mass are transferred by the end of the fibre. A combination from both air flow directions is provided by a crossflow path that is selectable in further embodiments.

A first collector may be arranged on at least one frontal face of the housing, wherein the first air stream may be guided to and away from the fibres via the first collector. The collector is arranged on the frontal face of the housing and essentially extends over the full width thereof. In this way hereby, the flow of incoming air is distributed evenly across the entire width of the housing, wherein all fibres may be exposed to the flow equally. In addition, the air stream is calmed via the collector, since the flow speed is reduced considerably by the increase in the cross-section.

At least one second collector may be assigned to the housing, wherein the second air stream may be guided to or away from the housing via this collector. The second collector may also be arranged on a frontal surface or on the top and/or bottom of the housing. The second collector assures uniform flow of the second air stream into the housing, wherein all the fibres are exposed to the air stream. Like the first collector, the second collector also calms the air flow, because in this case as well the wider cross-section causes the flow rate to be slowed significantly.

The second collector may surround the first collector at least partially. In this case, the second collector surrounds the first collector in the manner of a rucksack. This is a particularly space-saving arrangement. The inflow and outflow may occur adjacent to one another, thereby avoiding dead areas.

The second collector may at least partially enclose the housing at the top and bottom. In this way, the second collector may be constructed with a larger volume.

The second collector may surround the housing in the manner of a clamp. This arrangement has the further advantage that no penetration of the first collector is necessary. In this embodiment, the second air stream is flows perpendicularly to the direction of the main stream.

The second collector may surround the housing in the manner of a ring. In this arrangement too, no penetration of the first collector is required. The second air stream also flows perpendicularly to the direction of the main stream in the form of a closed ring. In this embodiment, an inlet opening may be provided on each side of the housing so that, for example, a square-shaped housing may have four inlet openings.

At least one frontal face of the housing may have at least one slit-like aperture. The slit-like aperture is provided in an area of the frontal face that is covered by the first collector. In this way, the air stream passing outside the fibres is caused to flow evenly over the entire width of the housing and dead areas where no flow occurs are minimised. The inflow occurs in a linear fashion. This is advantageous in contrast with a punctiform inflow, which results for example with an inflow through bore holes. With the punctiform inflow, dead areas occur in which no inflow occurs and the loss of pressure is greater than with a slit-like aperture.

A sift-like aperture may be provided in each area enclosed by the second collector on the top or the bottom of the housing. The simultaneous airflow from the top and the bottom results in an advantageous behaviour of the air stream that flows outside of the fibres, wherein dead areas are minimised. This is particularly advantageous in the case of the flat design in accordance with the invention, because when the housing is of flat construction the air stream penetrates the housing fully in a vertical direction with only a small loss of pressure. Since an annular collector surrounds the housing on all sides, slit-like apertures may also be provided on the sides in this embodiment.

The slit-like aperture may extend essentially over the entire width of the housing. In this way, all the fibres are exposed evenly to the air flow and again the dead areas where no air flows are minimised.

Both frontal faces may be equipped with second collectors, which may communicate conductively with one another by an adjustable bypass.

The water content of the humidifying air may be adjusted via the bypass and residual moisture in the humidifying air may be fed back into the circuit after it exits the humidifier.

In order to assure the required moistening effect with compact housings, which are higher because of their shorter length, an additional cavity may be provided on the top and/or bottom of the housing. This additional cavity opens towards the fibres and may be square in shape and may essentially completely cover both the top and the bottom of the housing. A slit-like aperture may be provided on the top of the wall of the additional cavity, for feeding air in and out. No fibres are arranged in the additional cavity, which means that the air stream introduced is distributed throughout the entire additional cavity and then flows evenly between the fibres. In this way, a cross-current is formed in this embodiment with a smaller loss of pressure than with a countercurrent.

BRIEF DESCRIPTION OF THE DRAWINGS

Some exemplary embodiments of the humidifier in accordance with the invention are explained in greater detail in the following with reference to the figures. The figures, which are all schematic in nature, show the following.

DETAILED DESCRIPTION OF THE INVENTION

Figure 1:
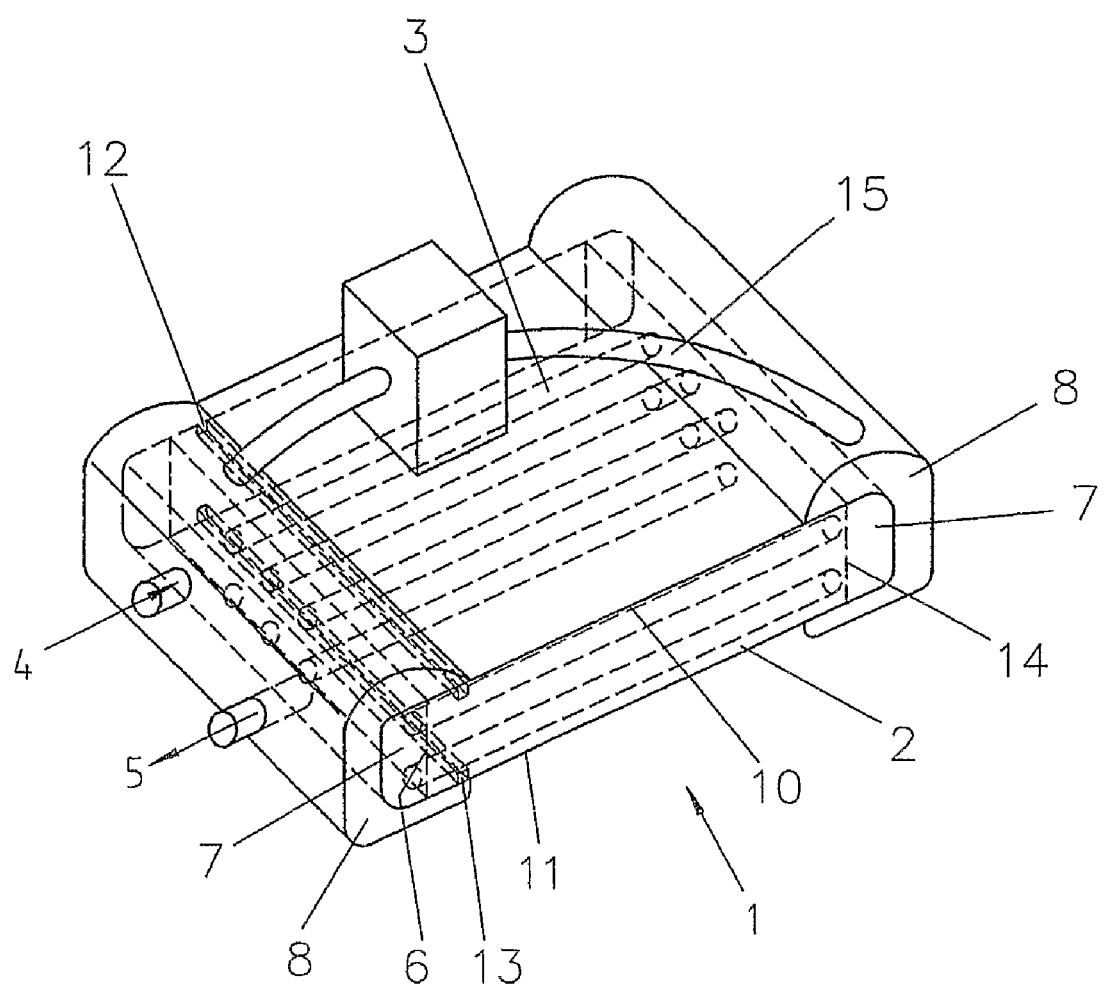
FIG. 1 the humidifier in accordance with the invention.

FIG. 1 shows a humidifier 1, with a housing 2 in which fibres constructed as steam-permeable hollow fibre membranes are arranged. Housing 2 is rectangular and of flattened construction. Housing 2 has a first collector 7 on both frontal faces 6, 14, through each of which a first air stream 4 may flow into and out of housing 2. First air stream 4 passes inside fibres 3. In addition, a second collector 8 is positioned on each of the two frontal faces 6, 14, wherein second collector 8 partially surrounds first collector 7, in this embodiment in the manner of a rucksack. In this way, in this embodiment the first collector 7 is configured as the inner collector and second collector 8 as the outer collector. Second collector 8 also partially encloses housing 2 at the top 10 and bottom 11. Second air stream 5 may be fed into and out of the housing through second collector 8. A slit-like aperture 12, 13 that extends the entire width of housing 2 is provided in areas on both the top 10 and bottom 11 of the housing that are enclosed by a second collector 8. Both second collectors 8 communicate conductively with one another via a bypass 15. Bypass 15 may have, for example, a throttle valve to adjust the volume flow. In this embodiment, first air stream 4, which flows inside fibre 3, serves as supply air for a downstream unit, which in this embodiment is a PEM fuel cell. Second air stream 5, which flows outside of fibre 3, forms a steam-containing humidifying air stream that may be created with the exhaust air from a PEM fuel cell enriched with steam. In this embodiment, the first and second air streams 4, 5 flow in opposite directions, and the flow of the second air stream 5 may be laminar.

Figure 2:
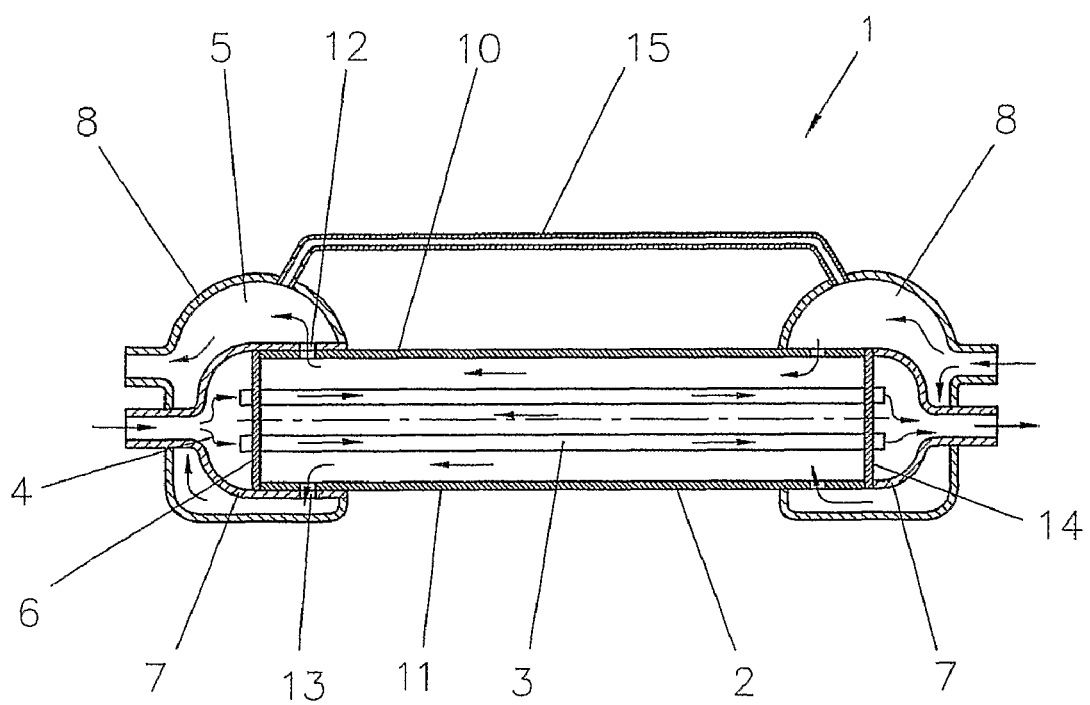
FIG. 2 the humidifier in longitudinal section.

FIG. 2 shows a humidifier 1 in accordance with FIG. 1 in longitudinal section. The two frontal faces 6, 14 of housing 2 are completely open in this embodiment and form a free flow cross-section for the first air stream. First air stream 4 is thus evenly distributed in first collector 7 and passes into or out of fibres 3 over the entire cross-section of frontal faces 6, 14. Fibres 3 are combined and arranged in housing 2 in bundles. The flow of second air stream 5 is guided into housing 2 via second collector 8 and via two slit-like apertures 12, 13. In this way, air flows around fibres 3.

Figure 3:
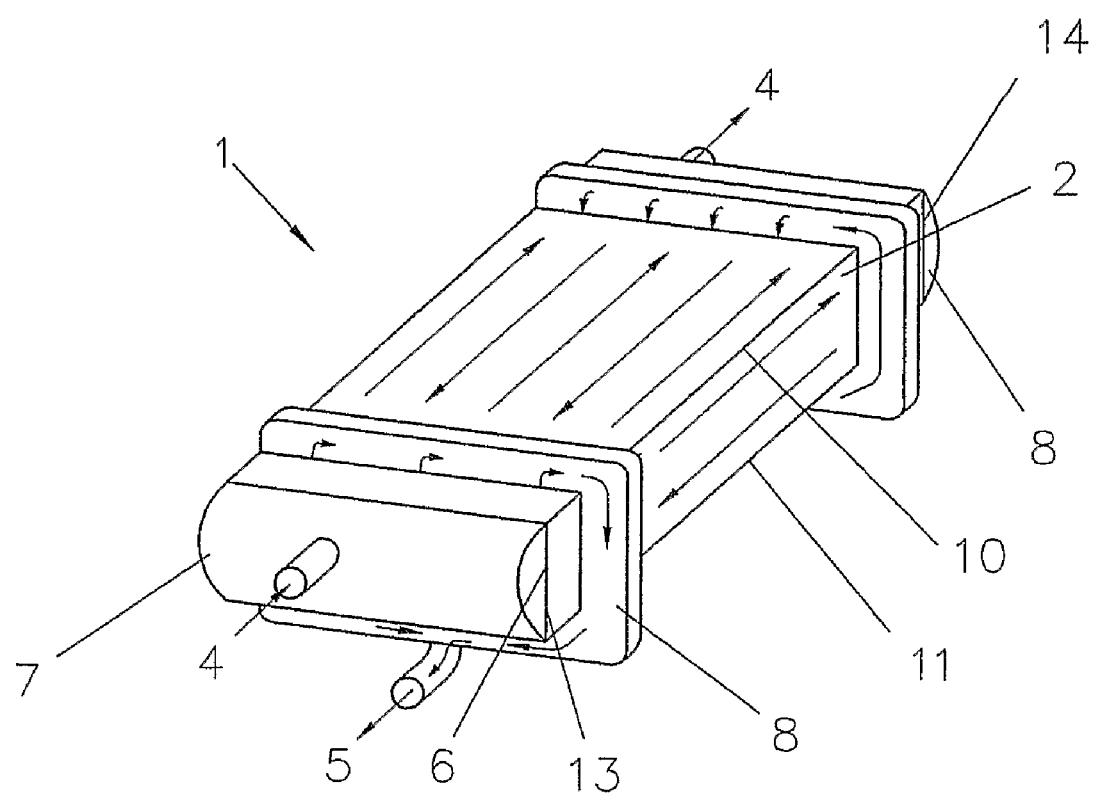
FIG. 3 a humidifier with a clamp-like second collector.

FIG. 3 shows a humidifier 1 in accordance with FIG. 1, wherein second collector 8 surrounds housing 2 in the area of the two frontal faces 6, 14, in this embodiment in the manner of a clamp. In this embodiment, collectors 7, 8 are arranged at a distance from one another on housing 2. Inlet openings in the form of slits (not shown) are arranged in the area of housing 2 that is covered by second collector 8.

Figure 4:
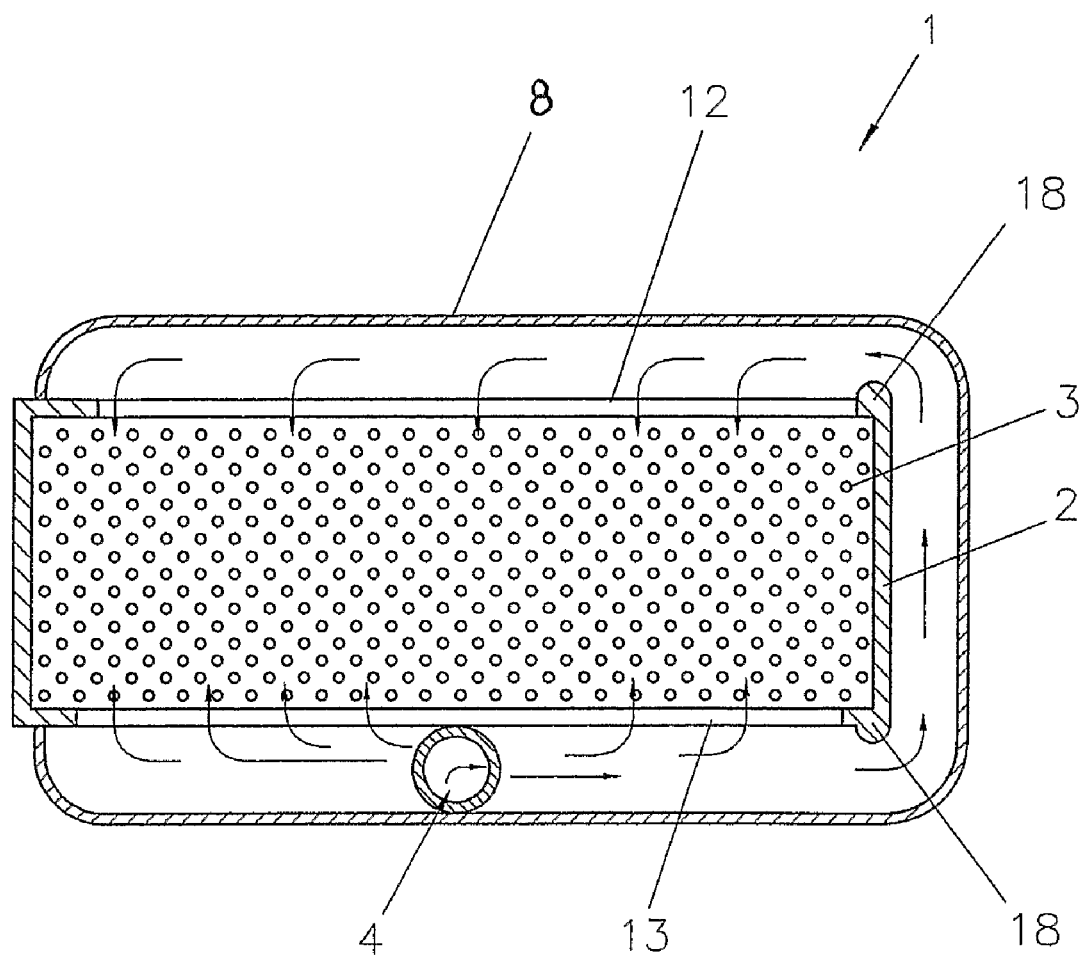
FIG. 4 the humidifier of FIG. 4 in cross-section.

FIG. 4 shows the humidifier 1 in accordance with FIG. 3 in cross-section. Housing 2 has a toric flow guide 18 in the area covered by second collector 8, in order to smooth out the flow.

Figure 5:
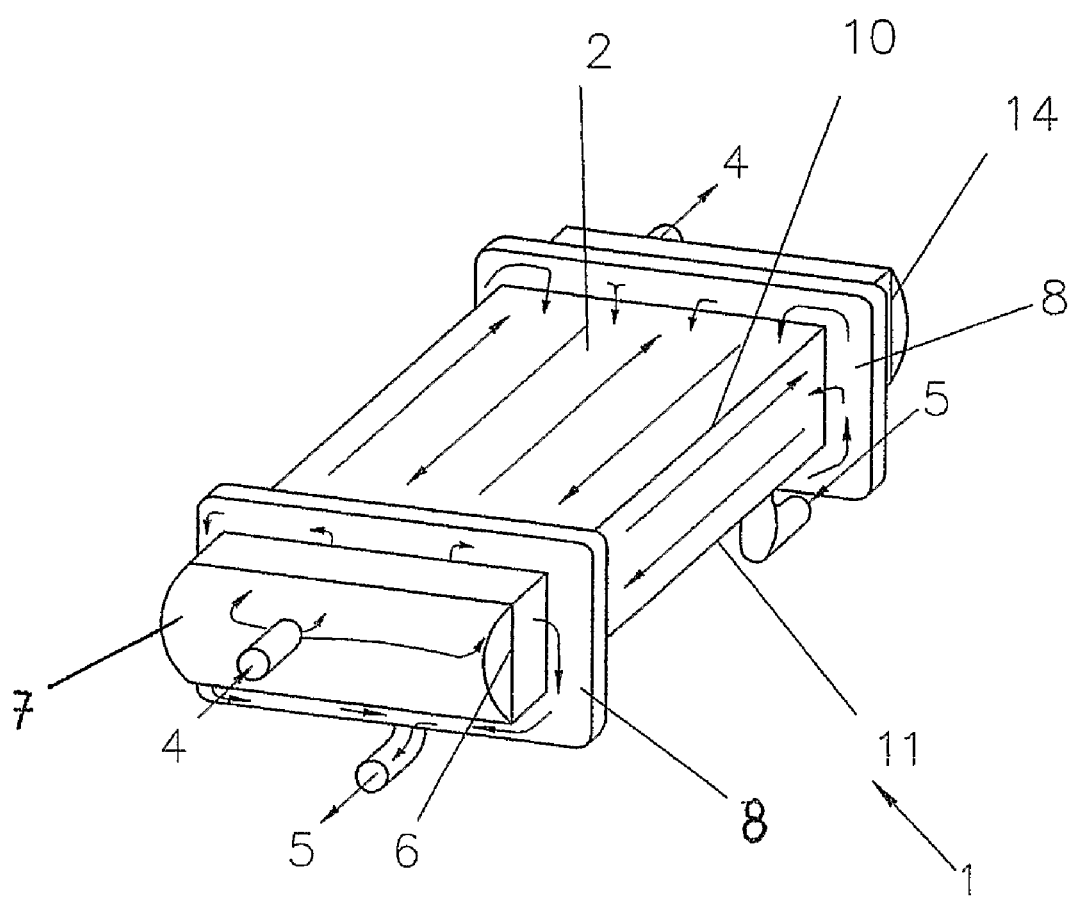
FIG. 5 a humidifier with a ring-like second collector.

FIG. 5 shows a humidifier 1 in accordance with FIG. 1, wherein second collector 8 surrounds housing 2 in the area of the two frontal faces 6, 14, in this embodiment in a ring shape. Collectors 7, 8 are arranged at a distance from one another on the housing 2. In this embodiment, slit-like inlet openings 12, 13 are provided on all four sides of housing 2 in the area covered by second collector 8.

Figure 6:
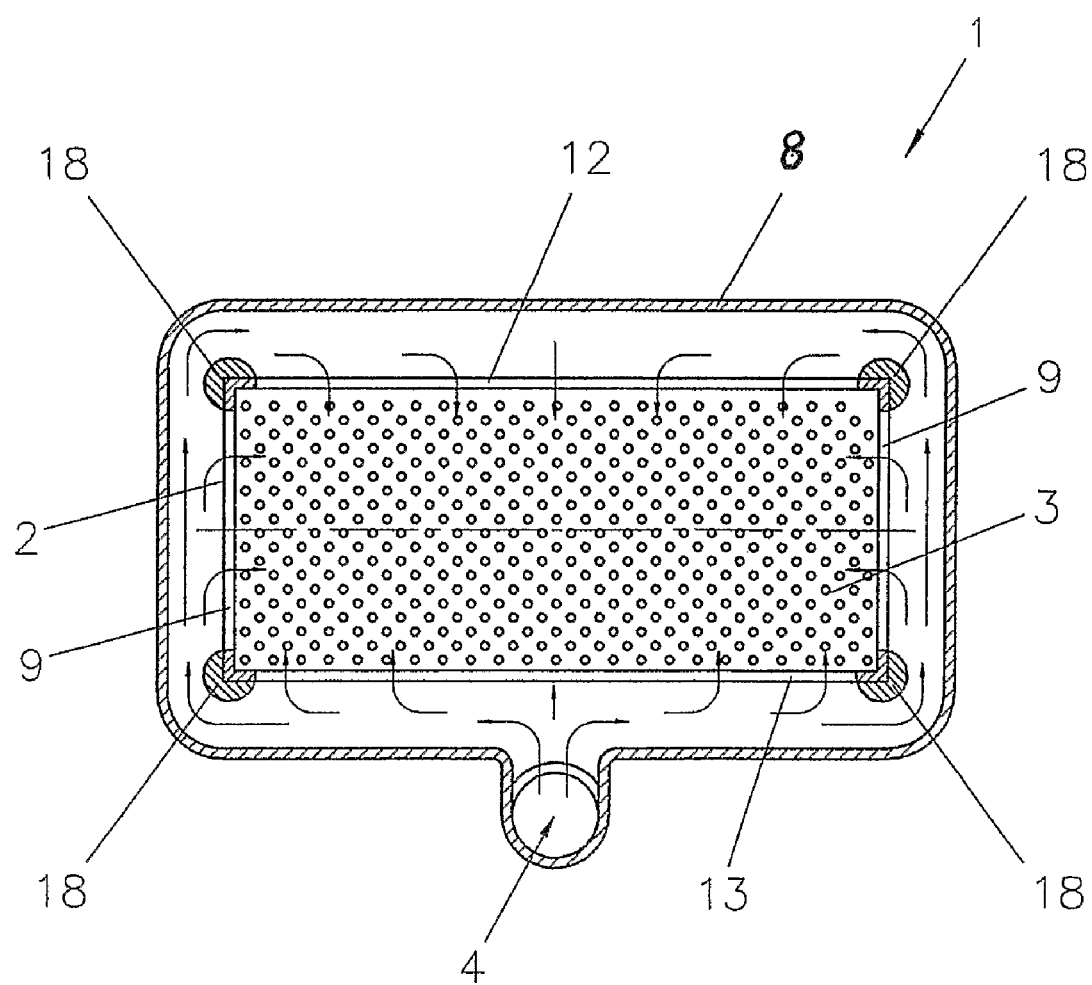
FIG. 6 the humidifier of FIG. 5 in cross-section.

FIG. 6 shows humidifier 1 in accordance with FIG. 5 in cross-section. Housing 2 has a toric flow guide 18 at the edges of the area covered by second collector 8 in order to smooth the flow.

Figure 7:
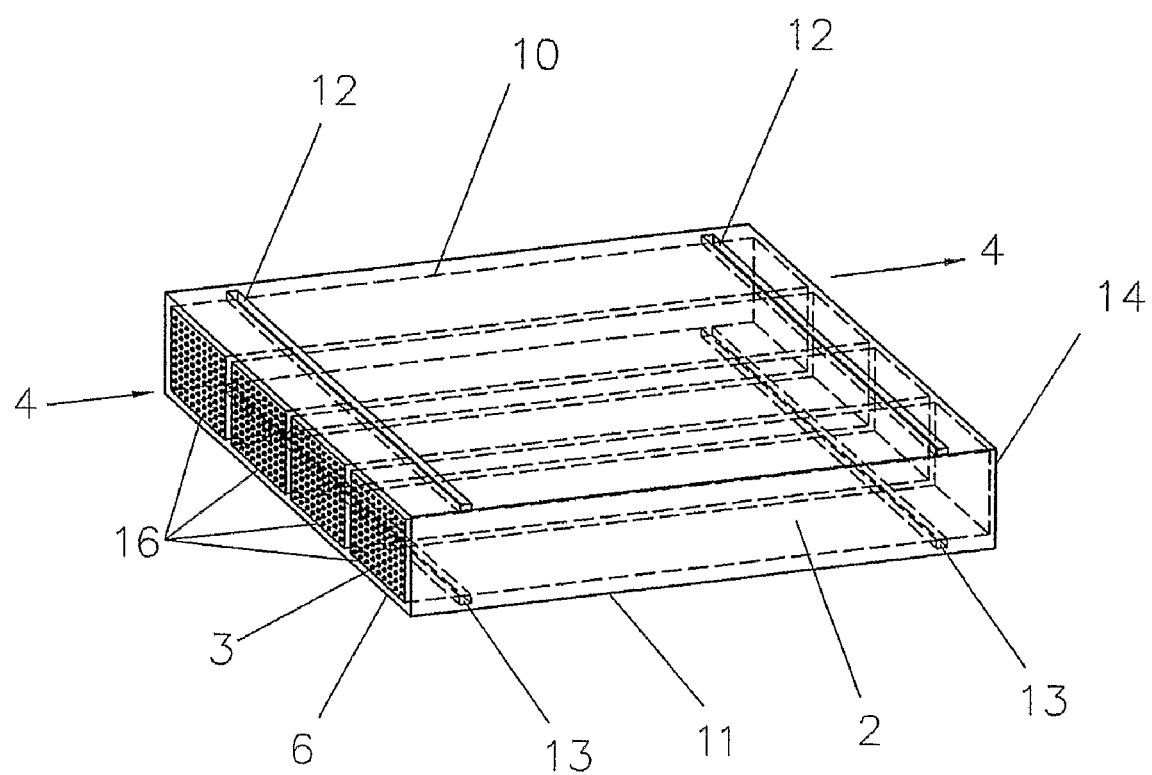
FIG. 7 the housing of the humidifier.

FIG. 7 shows a housing 2 for a humidifier 1 in an embodiment in accordance with the previous figures. Housing 2 is rectangular and flattened. The two frontal faces 6, 14 are completely open. Four bundles 16 are arranged in housing 2, a large number of fibres 3 being arranged in each of the bundles 16. First air stream 4, which flows inside fibres 3, may be guided via frontal faces 6, 14. Slit-like apertures 12 and 13 are provided on both the top 10 and bottom 11 thereof. Second air stream 5 may be guided via slit-like apertures 12, 13.

Figure 8:
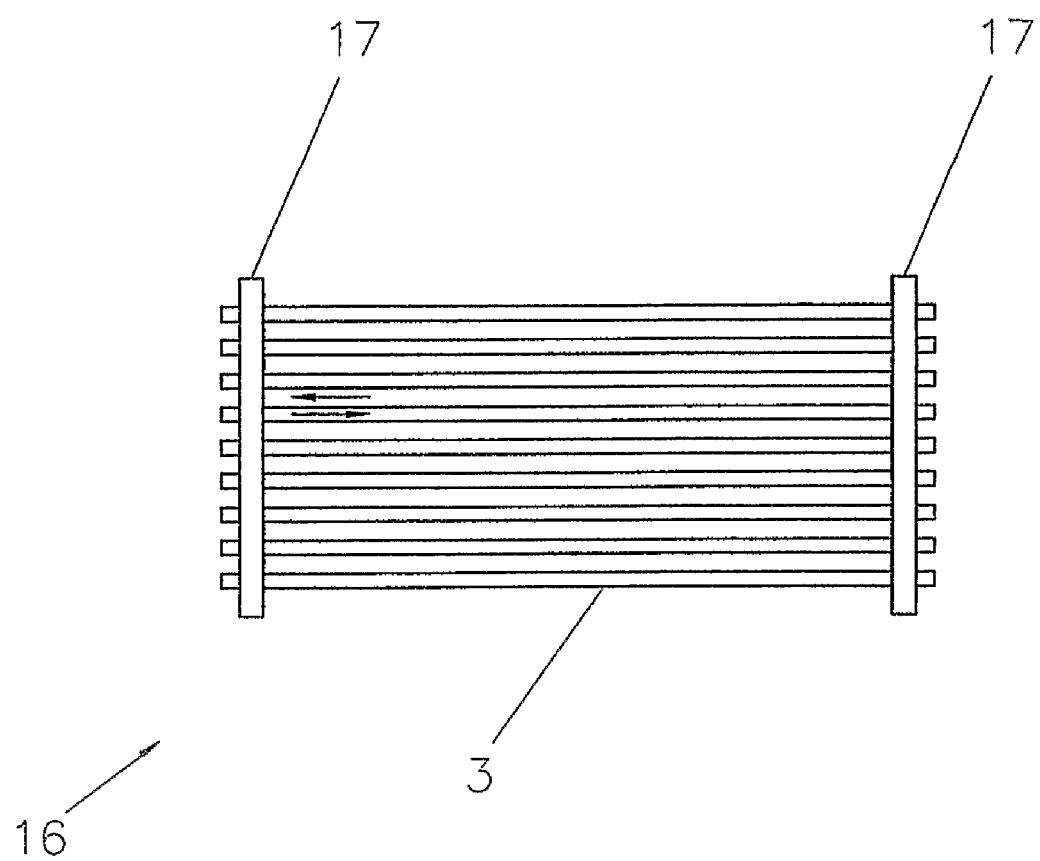
FIG. 8 an arrangement of the fibres in the humidifier.

FIG. 8 shows a bundle 16 in which a multiplicity of fibres 3 are combined. Bundle 16 has a ring 17 on its frontal faces, via which the fibres are stabilised. Ring 17 is made from a resin and the fibres are stuck together thereby, the spaces between the fibres are penetrated by the resin and thus sealed airtight. The outer circumference of ring 17 forms a circumferential seal. In this way, bundles 16 are arranged in the housing in such manner that first air stream 4 and second air stream 5 are unable to mix.

The invention claimed is:

1. A humidifier comprising:

a housing, at least a portion of which is flattened, a plurality of fibers configured as water-permeable, hollow fiber membranes arranged within said flattened housing portion, wherein a first air stream may be passed inside the plurality of fibers and a second air stream may be passed outside the plurality of fibers, wherein a first collector is arranged on at least one frontal face of the housing, wherein the first air stream may be passed into or out of the plurality of fibers via the first collector, wherein at least one second collector is assigned to the housing, wherein the second air stream may be passed into or out of the housing via the second collector, and wherein two second collectors are provided at opposite faces of the housing, and communicate conductively with one another via an adjustable bypass.

2. The humidifier of claim 1, wherein the first air stream serves as a steam-containing humidifying air stream for a downstream unit and the second air stream serves as a supply air stream.

3. The humidifier of claim 1, wherein the first air stream and the second air stream may be guided in opposite directions.

4. The humidifier of claim 1, wherein a second collector at least partially surrounds the first collector.

5. The humidifier of claim 1, wherein a second collector at least partially surrounds the housing at the top and bottom.

6. The humidifier of claim 1, wherein a second collector surrounds the housing in a clamp-like manner.

7. The humidifier of claim 1, wherein a second collector surrounds the housing in the manner of a ring.

8. The humidifier of claim 1, wherein at least one frontal face of the housing has at least one slit-like aperture.

9. The humidifier of claim 8, wherein the slit-like aperture extends substantially across the full width of the housing.

10. The humidifier of claim 1, wherein a slit-like aperture is provided on the top and the bottom of the housing in each area enclosed by a second collector.

11. The humidifier of claim 1, wherein the flow of the second air stream is guided in laminar manner inside the housing.

12. The humidifier of claim 1, wherein the shape of the flattened housing portion is substantially rectangular.

13. The humidifier of claim 1, wherein two first collectors are provided at opposite faces of said housing and communicate conductively with one another via said flattened housing portion.

14. The humidifier of claim 13, wherein the first air stream may be passed into the plurality of fibers via one of the two first collectors and may be passed out of the plurality of fibers via the other of the two first collectors.

15. The humidifier of claim 1, wherein the second air stream may be passed into said adjustable bypass via one of the two second collectors and may be passed out of said adjustable bypass via the other of the two second collectors.

* * * * *